United States Patent
Blaze et al.

(10) Patent No.: US 6,789,068 B1
(45) Date of Patent: Sep. 7, 2004

(54) SYSTEM AND METHOD FOR MICROBILLING USING A TRUST MANAGEMENT SYSTEM

(75) Inventors: Matthew A. Blaze, New York, NY (US); John Ioannidis, New York, NY (US); Angelos Keromytis, Philadelphia, PA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/436,081

(22) Filed: Nov. 8, 1999

(51) Int. Cl.[7] .............................................. G06F 17/60
(52) U.S. Cl. .................................... 705/64; 705/75
(58) Field of Search .............................. 705/76, 65, 5, 705/50, 26, 41, 64, 75; 380/227

(56) References Cited

U.S. PATENT DOCUMENTS

| | | | | |
|---|---|---|---|---|
| 5,422,953 A | * | 6/1995 | Fischer ........................ | 380/23 |
| 5,768,385 A | * | 6/1998 | Simon .......................... | 380/24 |
| 6,108,425 A | * | 8/2000 | Smith, Sr. .................... | 380/277 |
| 6,157,917 A | * | 12/2000 | Barber ......................... | 705/26 |
| 6,463,534 B1 | * | 10/2002 | Geiger et al. ............... | 713/168 |

FOREIGN PATENT DOCUMENTS

| EP | 738 058 A2 | * 10/1996 | ............. H04L/9/08 |
|---|---|---|---|

OTHER PUBLICATIONS

AT&T to license smart card technology for cashless transactions, AT&T News Release, May 31, 1995.*
Drinkers travel miles to buy soda with cell phones, Kuriko Miyake, IDG New Service/Tokyo Bureau, Sep. 3, 2001.*
US 2001/0034566 A1 Oct. 2001 Offer.*

* cited by examiner

Primary Examiner—Tariq R. Hapiz
Assistant Examiner—Johnna Stimpak

(57) ABSTRACT

The present invention provides a microbilling system that integrates with existing billing systems and existing devices. In a preferred embodiment of the invention, the devices store digital certificates with short-lived expiration dates and specifying transaction limits, preferably using a trust management system. A provisioning agent periodically (e.g., once a day) issues the certificates over a secure channel to the devices. When conducting a purchase transaction, the devices exchange certificates via a communication channel (that need not be secure) and the purchasing device issues a digitally signed electronic check which is periodically deposited over an advantageously secure channel with a clearing service. The present invention enables microbilling transactions by embedding liability in the certificates.

11 Claims, 2 Drawing Sheets

KeyNote-Version: 2
Comment:   This credential permits the holder of the key RSA: def456
           to spend up to two dollars per transaction to buy soda or cookies.
           If the holder spends a dollar or more, the transaction is logged.

Authorizer: "RSA:abc123"      # Key of the Provisioning Agent

Licensees: "RSA: def456 "     # Key of the ECW

Conditions: ((app_domain="SPEND") &&
            (product == "soda" || product == "cookies" ))
            -> { (@(dollars) < 1) -> _MAX_TRUST;
               (@(dollars) < 2) -> "ApproveAndLog";
              };

Signature: "RSA-SHA1:123456"      # Digital Signature of Provisioning Agent

Figure 2

KeyNote-Version: 2
Comment:   This credential permits the holder of the public key RSA: ghi789
           to accept payments for soda.

Authorizer: "RSA:abc123"      # Key of the Provisioning Agent

Licensees: "RSA: ghi789 "     # Key of the VCC

Conditions: (app_domain="VEND") &&
            (product == "soda")

Signature: "RSA-SHA1:789012"      # Digital Signature of Provisioning Agent

Figure 3

SYSTEM AND METHOD FOR MICROBILLING USING A TRUST MANAGEMENT SYSTEM

FIELD OF THE INVENTION

The present invention relates generally systems and methods for conducting commercial transactions and, more particularly, to systems and methods for conducting commercial transactions of small monetary value without using cash.

BACKGROUND OF THE INVENTION

The usage of hard physical currency remains the pervasive means for facilitating high volume transactions of small monetary value (i.e. microbilling). A secure cashless commercial transaction system enabled for widespread use in microbilling has been the goal of numerous developments in the prior art. The requirement that persons must carry change or small bills of currency in order to conduct day-to-day transactions (e.g. paying for the services provided by a vending machine) has been seen as a burdensome antiquated inconvenience that should be dispensed with through the use of modem technology. The reality has been that the shortcomings of the prior art, both technical and practical (as well as sociological), have rendered prior art microbilling schemes less than popular in the United States and elsewhere.

Current microbilling systems rely in essence on either (a) a strong identification of the party; (b) trustworthy tamper-resistant hardware; and/or (c) secure network facilities for on-line transactions.

For example, perhaps the most-commonly used alternative cashless transaction system used today is the traditional debit card system, which utilizes plastic cards contains cardholder and certifier information digitally encoded on a magnetic strip. The user must memorize and be able to key-in a personal identification number (PIN) at the time of the transaction for security purposes. The PIN is supposed to be a secret known only by the cardholder enabling the cardreader to presume the identity of the cardholder based on the ability of the person to demonstrate, through some relevant protocol, knowledge of the PIN or password. The current use of passwords and PINs for credentials is notoriously insecure, user-unfriendly, and generally inadequate for electronic commercial transactions. For example, PINs and passwords lack the persistence and auditable nature of a hand-written documentary signature and can only be verified at the time of use.

Modern cryptographic techniques have offered alternative systems based on the notion of digital signatures and certificates. An electronic document is "signed" by applying a cryptographic private key controlled by the signer to obtain a hash value called a digital signature: the signature can be verified using public information, i.e. a public key which is used to verify that the signer"s secret key was utilized to sign the document. Digital certificates are electronic credentials signed by—and thereby authenticated by—a trusted certificate-issuing authority. Legislation has been proposed in numerous jurisdictions to give some form of legal effect to digital signatures, and digital signatures and certificates are used in various recent electronic-commerce schemes—each with its own disadvantages.

For example, Mastercard has proposed what is known as the Secure Electronic Transaction (or "SET") standard specification which describes a relatively complex structure for making payments using digitally signed certificates within the current credit card payment support infrastructure. See "SET Secure Electronic Transaction Specification," Version 1.0, May 31, 1997, setco.org. SET has an elaborate structure of signed certificates: the cardholder receives a certificate that functions as an electronic representation of a traditional credit card; the merchant receives a certificate that functions as an electronic substitute for the payment brand decal that traditionally appears in a store window; the issuer of the cardholder's certificate is a financial institution that maintains the cardholder's account and must have its own certificate; the merchant's bank has its own certificate; payment gateway certificates are used for the systems that process authorization and capture messages; etc. The various certificates are used to support cryptographic keys that are used to provide credit card transaction messages with security properties such as privacy and authenticity. The SET scheme implicates a complex hierarchy of trust involved in the issuance and revocation of these certificates—which in turn necessitates a complex certificate revocation infrastructure, on-line verification procedures, as well as a significant amount of computation on the parts of multiple parties to complete a single transaction.

Other proposals include systems that function as electronic analogues to paper checks and cash itself. The use of such systems requires complicated risk management techniques. Electronic checks are digitally signed by a payer and certified by the payer's bank, like a written paper check. They use the same relatively expensive clearing system and clearing network used by paper checks, as well as incur the additional cost of administering certificate revocation lists which must be consulted by the payee. Electronic cash systems, on the other hand, represent cash as digital bearer certificates or by value registers in smart cards, and, accordingly, have multiple risks associated with their usage. Encapsulating information in a tamper-resistant smart card, e.g. mondex.com, or other secure container invites attempts to compromise the container. In the case of digital bearer certificates, e.g. digicash.com, measures must be employed in a network to ensure that each certificate, which can normally be copied freely, is spent precisely once.

SUMMERY OF THE INVENTION

The present invention provides a microbilling system that integrates with existing billing systems and existing devices, such as cellular telephones and personal digital assistants. In a preferred embodiment of the invention, the devices store digital certificates with short-lived expiration dates and specifying transaction limits, preferably using a trust management system. A provisioning agent periodically (e.g., once a day) issues the certificates over an advantageously secure channel to the devices. When conducting a purchase transaction, the devices exchange certificates via a communication channel (that need not be secure) and the purchasing device issues a digitally signed go electronic check which is periodically deposited over a secure channel with a clearing service. The invention permits a user to simply point an enhanced portable electronic device, such as a cell phone, at a vending machine and have purchases billed automatically to the user.

The present invention enables microbilling transactions by embedding liability in the certificates. Unlike prior art microbilling systems, the present invention advantageously can be conducted off-line without special tamper-resistant hardware or special personal identification protocols such as memorizing a PIN. These and other advantages of the

BRIEF DESCRIPTION OF THE DRAWINGS

FIG. 2 is an example of a KeyNote digital certificate issued to a electronic check writer.

FIG. 3 is an example of a KeyNote digital certificate issued to a vendor check collector.

DETAILED DESCRIPTION

Figure 1:
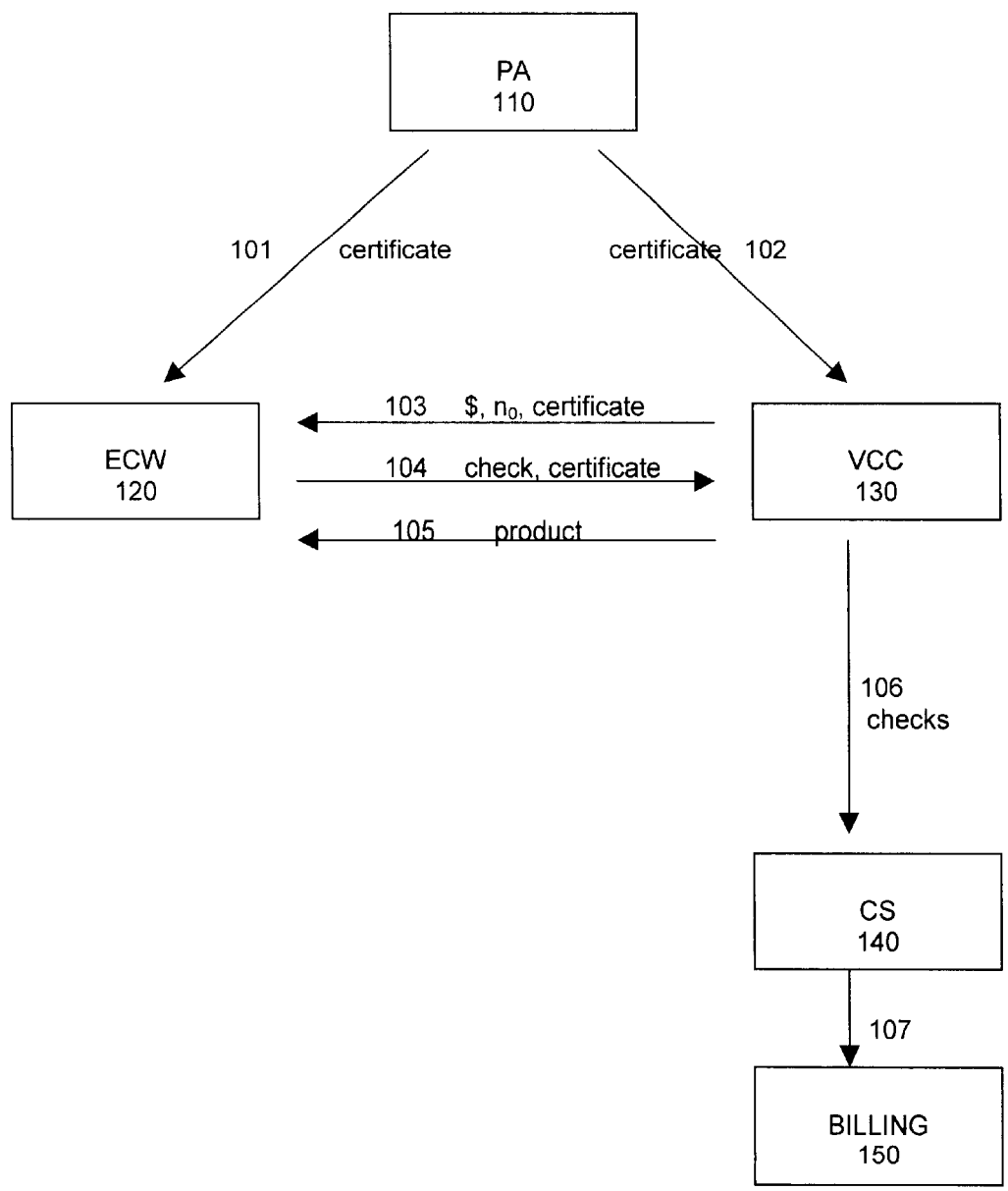
FIG. 1 is a diagram illustrating embodiments of the present invention.

FIG. 1 illustrates various embodiments of the present invention. The following is a definitional list of the different entities involved in FIG. 1, and their role in the instant microbilling system:

Provisioning Agent. The Provisioning Agent 110 is an entity responsible for the issuance of digital certificates/credentials to the Electronic Check Writer ("ECW") and the Vendor Check Collector ("VCC"), both described below. The Provisioning Agent should have a communication channel available to the ECW and the VCC, preferably a secure channel, for the regular dissemination of digital certificates. Accordingly, the Provisioning Agent optimally has access to a telecommunication infrastructure, such as a wireless network. The Provisioning Agent is a trusted entity and has a well-known public cryptographic key and a corresponding secret private key which it uses to sign certificates. The Provisioning Agent's public key should be known to at least both the ECW and the VCC.

Electronic Certificate Writer/Electronic Check Writer "ECW"). The ECW 120 is an electronic device that is under the control of the individual/party that is engaging in the relevant microbilling transaction. Typically, this entails that the party is a customer purchasing a good or service from a vendor. The party interacts with the microbilling system through use of the ECW. The ECW can be incorporated into any computing device with a central processing unit and with a machine readable storage device (e.g., RAM or other types of memory, magnetic disk or other forms of non-volatile storage). The ECW can be incorporated into non-portable devices such as a desktop computer, although the ECW is preferably a portable device. For example, the ECW can be embodied in a wireless telephone, can be a component in a typical personal digital assistant such as a 3Com Palm©, or another portable electronic device. The ECW has a private cryptographic key stored in the device, preferably in some form of non-volatile memory. The public key of the ECW is made known initially to at least the Provisioning Agent. The ECW should have some form of interface enabling communication with the Provisioning Agent and the VCC, as described below. Such an interface may be, for example, to a wireless communication transceiver or an infra-red link or a modem or a direct cable connection to a communications network, etc. The same interface can be used to enable communication with both the VCC and the Provisioning Agent or different interfaces can be utilized. In a preferred embodiment of the present invention, communication between the ECW and the Provisioning Agent occurs over a secure channel, such as an encrypted channel across a secure communication network, for the purposes of provisioning.

Vendor Certificate Collector/Vendor Check Collector "VCC"). The VCC 130 is an electronic device under the control of the other party to the transaction, typically a vendor wishing to sell either goods or services to the person in possession of the ECW. The VCC enables the vendor to carry forth a commercial transaction with the ECW operators. The VCC can be a component of a larger service device, such as a vending machine, or can be a stand-alone unit utilized by a proprietor. As in the case of the ECW, the VCC should have a central processing unit and a machine readable storage device. As the business model advantageously requires, the VCC can have a private/public cryptographic key pair: the private key stored in the device and the public key of the VCC made known initially to at least the Provisioning Agent. Likewise, the VCC should have some form of interface enabling communication with the Provisioning Agent and the customer's ECW.

The Clearing Service. The Clearing Service 140 is an entity that receives digital certificates or electronic checks from VCCs and arranges for the proper credits and debits to be applied to each vendor and customer.

Billing and Crediting. The Billing and Crediting entity 150 maintains the apparatus necessary to obtain and transfer monetary payment from and to the relevant parties involved in a transaction. For example, the entity can be a bank or financial institution that handles the payer/payee's banking or financial transactions. The entity can also be any other entity with an established billing relationship with a payor, e.g. a long distance company. Preferably, each customer has an account established with this entity for some other purpose, or has established accounts for the sole purpose of using an ECW.

In accordance with an embodiment of the present invention, at 101 in FIG. 1, the Provisioning Agent 110 issues a digital cryptographic certificate to the ECW 120. The digital certificate has an expiration date, preferably selected with regard to the natural frequency of the communications between the ECW and the Provisioning Agent. For example, where the ECW is a wireless communication device, such as a cellular telephone, the expiration time can be as short as a day. The certificate identifies the public key of the ECW and has attributes indicating that the holder of that public key is authorized by the Provisioning Agent to conduct specified limited transactions. The limits on the transactions can address the business risks involved as well as advantageously model business behavior.

The certificate can specify the limits of the transaction in any of a number of different ways. For example and without limitation, the certificate can indicate that the public key holder can only purchase up to one dollar per transaction to buy certain types of goods, such as soda or cookies. The certificate can not only encode spending limits and time limits, it can dynamically adjust limits or other variables such as prices depending on the passage of time or on the occurrence of certain events. For example, the certificate can encode a decreasing purchasing limit with the passage of time so that a stale certificate, while still valid, can still be liable. The certificate can arrange to provide discounts, for example on soda at certain times of the day or when the temperature is too cold for popular consumption.

In a preferred embodiment of the invention, the certificate specifies the above-mentioned transaction limits using a trust management system such as KeyNote, as described in "The KeyNote Trust-Management System Version 2," RFC 2704, Network Working Group IETF, September 1999, which is incorporated herein by reference. Trust management (introduced in the PolicyMaker system, a predecessor superset to KeyNote) is a unified approach to specifying and interpreting security policies, credentials, and relationships; it allows the use of certificates for direct authorization of security-critical actions. A trust-management system provides standard, general-purpose mechanisms for specifying application policies and credentials. Trust-management credentials describe a specific delegation of trust and secure the role of public key certificates; unlike traditional certificates, which bind keys to names, credentials bind keys directly to the authorization to perform specific tasks. For example, FIG. 2 sets forth an example of a certificate issued to an ECW using the KeyNote Trust Management System. The certificate sets forth credentials permitting the ECW, namely the holder of the RSA key "def456" to spend up to two dollars per transaction to buy soda or cookies. If the holder spends a dollar or more, the transaction is approved but logged. The holder is only permitted to purchase soda or cookies; the credential does not permit the purchase of, for example, newspapers. The use of a trust management system advantageously allows a policy to change over time without having to reprogram the logic in specific VCCs and/or ECWs.

Similarly, the Provisioning Agent 110 can issue a digital certificate to the VCC 130. The digital certificate identifies the public key of the VCC and has attributes indicating that the holder of that public key is authorized by the Provisioning Agent to conduct specified limited transactions. Again, the certificate can specify the limits of the transaction in any of a number of different ways—including as a KeyNote credential. For example and without limitation, the certificate can indicate that the public key holder is authorized by the Provisioning Agent to accept payment for the purchase of soda. See, e.g., FIG. 3. The certificate includes an expiration date, preferably selected with regard to the natural frequency of the communications between the VCC and the Provisioning Agent.

After the issuance of proper digital certificates to the VCC and ECW, they can interact and facilitate a microbilling transaction. For example, a customer carrying an ECW, say in the form of a cell phone, can approach a VCC-enabled vending machine and select a soda for purchase. In accordance with a preferred embodiment of the invention, a wireless communication link is established between the cell phone and the vending machine, for example by pointing the cell phone at the vending machine. A user-friendly interface should be provided to permit the customer to choose to pay for the soda: for example, by displaying product information such as "COLA, 75 CENTS" on a screen on the vending machine or the cell phone while permitting the user to press a "YES" button before initiating the transaction process. One the transaction is initiated, the following process, in accordance with an embodiment of the present invention, occurs:

As shown in FIG. 1, at 103, the VCC sends to the ECW (a) a request to pay a certain monetary amount, (b) a nonce (a random number to guarantee the uniqueness of the transaction), and (c) the digital certificate issued to the VCC proving that it is a legitimate machine to accept digital payment. The ECW then generates a certificate which indicates that payment should be made to the public key of the VCC for the transaction, identified by the nonce value, in the amount specified by the VCC. The ECW then signs the certificate with its own private key. Where the transaction, as above, is a payment initiated by the ECW, the certificate can be seen as an electronic analogue of a check. Unlike traditional checks or prior art electronic checks, the electronic checks "written" by the ECW can only be used to perform certain types of transactions specified in the certificate issued by the Provisioning Agent. The ECW at 104 takes the electronic check and its short-term certificate and transmits both to the VCC. Depending on the computational power of the VCC, the VCC will perform what minimal verifications it can on the certificates provided before dispensing the product at 105. For example, the VCC can verify that the signature on the electronic check matches that specified in the short-term certificate. If it does not, then the VCC can refuse to dispense a soda. Additionally, where the computational power exists in the VCC to implement a trust management compliance checker, the VCC can determine whether the electronic check satisfies the policy set forth in the short-term digital certificate issued to the ECW by the Provisioning Agent. For example, if the ECW has a short term certificate in the form of FIG. 2, and the vending machine dispenses newspapers, then the VCC's compliance checker will indicate that the transaction is not approved.

The VCC 130 stores the electronic checks for transmission at 106 to the Clearing Service 140. Periodically (e.g., once a day), the vending machine contacts the Clearing Service 140 and transmits information regarding all transactions that occurred within the period of time, effectively "depositing" the electronic checks. The Clearing Service verifies the uniqueness and validity of the electronic checks, and then credits the vendor and debits the user appropriately. The debit can be in the form of a charge to the user's cell phone bill; the credit in the form of an electronic deposit to the vendor's bank account. The information can be passed along at 107 for processing by the appropriate billing and crediting entities 150, e.g. here the wireless service company and the vendor's bank. At the end of the billing period, all such transactions appear on the user's telephone bill, enabling the customer to pay for the transactions in one lump sum along with the rest of the bill. Similarly, the vendor can be credited by the bank in one lump sum to avoid banking fee overheads.

The above system has a low overhead for low-valued transactions and integrates with existing billing systems. It advantageously has a risk model similar to established risk models for telephone bill payment and vending machine purchases.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. For example, the detailed description described application of the present invention to vending machine purchases. However, the principles of the present invention could be extended to perform other types of commercial transactions. Such an extension could be readily implemented by one of ordinary skill in the art given the above disclosure.

What is claimed is:

1. An apparatus for conducting a microbilling transaction comprising:
   a portable electronic check writing device under control of the individual or party engaging in the transaction;
   a machine readable storage device for storing a public key and digital certificates;
   a first interface for communication with a provisioning agent;

a second wireless interface for communication with a vendor certificate collector; and a central processing unit, connected to said storage device and said first and second interface, for executing computer program instructions, said computer program instructions causing the central processing unit to perform the steps of:

receiving and storing a first digital certificate issued by the provisioning agent with an expiration date via the first interface;

receiving a transaction request from a vendor certificate collector and a second digital certificate via the second interface;

creating a third certificate responding to the transaction request using information in the second digital certificate;

signing the third certificate using the public key wherein the signing is performed by the electronic check writer; and transmitting the first digital certificate and the third digital certificate to the vendor certificate collector.

2. The apparatus of claim 1 wherein the apparatus has a secure communication channel to the provisioning agent.

3. The apparatus of claim 2 wherein the apparatus will not proceed with a transaction unless the second digital certificate has not expired.

4. The apparatus of claim 3 wherein the first and second digital certificates have properties specified using a trust management language.

5. The apparatus of claim 4 wherein the first digital certificate and the second digital certificate specify a security policy permitting limited types of transactions.

6. The apparatus of claim 5 wherein transactions are limited by a specified monetary value.

7. The apparatus of claim 5 wherein transactions are limited to specific types of products.

8. The apparatus of claim 1 wherein the transaction request is a request for payment for sale of a product.

9. The apparatus of claim 8 wherein the third digital certificate is an electronic check authorizing payment for the product.

10. The apparatus of 1 wherein the apparatus is a wireless communication device.

11. The apparatus of 1 wherein the apparatus is a personal digital assistant.

* * * * *